(12) United States Patent
Chow et al.

(10) Patent No.: US 11,383,497 B2
(45) Date of Patent: Jul. 12, 2022

(54) CO-INJECTION-MOLDED MULTILAYER STRUCTURE

(71) Applicant: KURARAY CO., LTD., Kurashiki (JP)

(72) Inventors: Edgard Chow, Houston, TX (US);
Gene Medlock, Houston, TX (US);
Wataru Hirose, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 87 days.

(21) Appl. No.: 16/342,425

(22) PCT Filed: Oct. 17, 2017

(86) PCT No.: PCT/JP2017/037461
§ 371 (c)(1),
(2) Date: Apr. 16, 2019

(87) PCT Pub. No.: WO2018/074445
PCT Pub. Date: Apr. 26, 2018

(65) Prior Publication Data
US 2020/0180279 A1 Jun. 11, 2020

Related U.S. Application Data

(60) Provisional application No. 62/409,055, filed on Oct. 17, 2016.

(51) Int. Cl.
| | | |
|---|---|---|
| *B32B 27/08* | (2006.01) | |
| *B32B 1/02* | (2006.01) | |
| *B32B 27/30* | (2006.01) | |
| *B32B 27/32* | (2006.01) | |
| *B29C 45/16* | (2006.01) | |
| *B65D 65/40* | (2006.01) | |
| *B29K 23/00* | (2006.01) | |
| *B29L 31/00* | (2006.01) | |

(52) U.S. Cl.
CPC .............. *B32B 27/08* (2013.01); *B29C 45/16* (2013.01); *B32B 1/02* (2013.01); *B32B 27/306* (2013.01); *B32B 27/32* (2013.01); *B65D 65/40* (2013.01); *B29K 2023/086* (2013.01); *B29K 2023/12* (2013.01); *B29K 2995/0067* (2013.01); *B29L 2031/712* (2013.01); *B32B 2250/03* (2013.01); *B32B 2250/40* (2013.01); *B32B 2307/7244* (2013.01); *B32B 2439/70* (2013.01)

(58) Field of Classification Search
CPC ....... B32B 27/306; B32B 27/18; B32B 27/32; B32B 2439/70; B32B 27/08; B32B 1/02; B32B 2250/03; B32B 2250/40; B32B 2307/7244; B32B 2250/24; B32B 2264/02; B32B 2264/105; B32B 2270/00; B32B 2307/7242; B32B 27/28; B65D 81/267; B65D 65/40; B29C 45/16; B29K 2023/086; B29K 2023/12; B29K 2995/0067; B29L 2031/712
USPC ...................................... 428/34.1, 35.7, 546
See application file for complete search history.

(56) References Cited

U.S. PATENT DOCUMENTS

| | | |
|---|---|---|
| 6,759,107 B1 | 7/2004 | Tai et al. |
| 2003/0031817 A1 | 2/2003 | Hayashi et al. |
| 2003/0207061 A1 | 11/2003 | Hayashi et al. |
| 2005/0153087 A1* | 7/2005 | Tsuji ........................ C08K 3/10 428/35.7 |
| 2008/0131638 A1 | 6/2008 | Hutton et al. |
| 2009/0061061 A1* | 3/2009 | Beckwith .............. B32B 27/306 426/546 |
| 2009/0169902 A1 | 7/2009 | Inubushi et al. |
| 2010/0068435 A1 | 3/2010 | Uradnisheck |
| 2015/0210788 A1 | 7/2015 | Okamoto et al. |
| 2017/0058159 A1* | 3/2017 | Lee ........................... B32B 7/12 |
| 2017/0087812 A1* | 3/2017 | Hirose ................... B32B 27/08 |

FOREIGN PATENT DOCUMENTS

| | | |
|---|---|---|
| CN | 1280148 A | 1/2001 |
| JP | 55-139228 A | 10/1980 |
| JP | 2000-63683 A | 2/2000 |
| JP | 2007-536114 A | 12/2007 |

(Continued)

OTHER PUBLICATIONS

International Search Report dated Jan. 9, 2018 in PCT/JP2017/037461 filed Oct. 17, 2017.
Extended Eurapesn Search Report issued far European Patent Application No. 17 862 128.0 dated May 12, 2020.
First Office Action issued for Chinese Patent Application No. 201780077988.3 dated Aug. 25, 2020 accompanied by Search Report (with machine English translation by the JPO).
Eval Resin & Film, EVOH Brochure of Kuraray (2010), 12 pages.

*Primary Examiner* — Yan Lan
(74) *Attorney, Agent, or Firm* — Oblon, McClelland, Maier & Neustadt, L.L.P.

(57) ABSTRACT

There is provided a co-injection-molded multilayer structure having a barrier layer and outer layers laminated on both sides of the barrier layer, wherein the barrier layer is made of a resin composition comprising an ethylene-vinyl alcohol copolymer (A) and an alkali metal salt (B) of a higher fatty acid having a melting point of 250° C. or lower; a content of the alkali metal salt (B) in the barrier layer is 50 to 1500 ppm in terms of metal atoms; and the outer layers are made of a resin composition comprising an unmodified polypropylene (E) and a maleic anhydride-modified polypropylene (F) having a lower melt viscosity than that of the unmodified polypropylene (E). Although it has no adhesive layers, the co-injection-molded multilayer structure exhibits excellent adhesiveness between the barrier layer made of an EVOH resin composition and the outer layer made of a polypropylene resin composition.

7 Claims, No Drawings

(56) References Cited

FOREIGN PATENT DOCUMENTS

| | | |
|---|---|---|
| JP | 2012-502175 A | 1/2012 |
| JP | 2012-193328 A | 10/2012 |
| JP | 2014-51319 A | 3/2014 |
| WO | WO 00/63085 A1 | 10/2000 |
| WO | WO 2005/108070 A2 | 11/2005 |
| WO | WO 2007/126157 A1 | 11/2007 |
| WO | WO 2010/030892 A1 | 3/2010 |
| WO | WO 2011/038886 A1 | 4/2011 |
| WO | WO 2015/141610 A1 | 9/2015 |

\* cited by examiner

CO-INJECTION-MOLDED MULTILAYER STRUCTURE

TECHNICAL FIELD

The present invention relates to a co-injection-molded multilayer structure comprising a barrier layer made of an ethylene-vinyl alcohol copolymer resin composition and outer layers laminated on both sides of the barrier layer. The present invention also relates to an ethylene-vinyl alcohol copolymer resin composition used for producing the structure.

BACKGROUND ART

An ethylene-vinyl alcohol copolymer (hereinafter, sometimes referred to as "EVOH") is a polymer material having excellent barrier performance against a gas such as oxygen and an organic chemical, which is extensively used as a variety of packaging material such as a film, a sheet and a container.

EVOH is a hygroscopic resin, and its barrier performance is reduced by moisture absorption. Therefore, for a container, EVOH is often used as a multilayer structure in which hydrophobic resin layers such as polyolefin layers are disposed on both sides of an EVOH layer for preventing moisture absorption. However, an EVOH layer is less adhesive to a hydrophobic resin layer. It is, therefore, common that an adhesive resin layer such as a maleic-anhydride-modified polyolefin is disposed between these layers. However, a complex layer structure inevitably leads to a higher production cost. Thus, it has been needed to develop an approach for layer adhesion without employing an adhesive resin layer.

When a multilayer structure is molded by co-injection molding, multiple types of resins molten in multiple cylinders are concurrently injected in a mold, and the mold is filled with the flowing molten multilayer structure, so that a multilayer structure is molded. Since it is technically difficult to form a uniform adhesive resin layer between an EVOH layer and a hydrophobic resin layer, it is common that hydrophobic resin layers are formed on both sides of an EVOH layer, not via an adhesive resin layer.

Patent Reference No. 1 has described a multilayer container comprising a first layer containing polypropylene, and a second layer containing a material selected from EVOH and Nylon which is directly adjacent to the first layer, wherein at least one of the first and the second layers further comprises maleic anhydride as an adhesive. Examples therein describe a container formed by co-injection molding to form a preform, followed by stretch blow molding. In accordance with the invention described in Patent Reference No. 1, interlayer adhesion between the first and the second layers is improved by adding an adhesive to either the first or the second layer.

Patent Reference No. 2 has described a multilayer structure comprising a polypropylene composition layer containing a polypropylene copolymer (A) having an MFR of 10 g/10 min or more at 230° C. and 2.16 kg and an maleic-anhydride-modified polypropylene homo- or co-polymer (B) having an MFR of 300 to 1000 g/10 min at 190° C. and 2.16 kg; and a polar polymer layer containing polyamide, polyvinyl alcohol, EVOH or a blend thereof. Examples therein describe a container made of a multilayer structure molded by co-injection molding. In accordance with the invention described in Patent Reference No. 2, interlayer adhesion between a polypropylene composition layer and a polar polymer layer is improved by using a polypropylene composition having a particular composition.

Patent Reference No. 3 has described an oxygen-absorbing resin composition comprising a thermoplastic resin (A) containing a carbon-carbon double bond substantially only in a main chain and a transition metal salt (B), wherein oxygen absorption per one mole of a carbon-carbon double bond in the thermoplastic resin (A) is 1.6 moles or more. It also has described a resin composition wherein thermoplastic resin (A) particles are dispersed in a matrix resin (E) such as EVOH, so that it develops higher oxygen barrier performance by absorbing oxygen.

PRIOR ART REFERENCES

Patent References

Patent Reference No. 1: WO 2000/063085 A
Patent Reference No. 2: WO 2011/038886 A
Patent Reference No. 3: WO 2007/126157 A

SUMMARY OF THE INVENTION

Problems to be Solved by the Invention

In accordance with the inventions described in Patent Reference Nos. 1 and 2, there is described a co-injected multilayer structure comprising an EVOH layer and polypropylene resin composition layers laminated on both sides of the EVOH layer, wherein adhesiveness between these layers is improved. However, it is insufficiently effective for preventing delamination in case of deformation of the multilayer structure. Thus, further improvement in adhesiveness has been needed.

Means for Solving the Problems

The above problems can be solved by providing a co-injection-molded multilayer structure having a barrier layer and outer layers laminated on both sides of the barrier layer, wherein the barrier layer is made of a resin composition comprising an ethylene-vinyl alcohol copolymer (A) and an alkali metal salt (B) of a higher fatty acid having a melting point of 250° C. or lower;

the ethylene-vinyl alcohol copolymer (A) has an ethylene content of 20 to 60 mol %, a saponification degree of 90% or more, and a melt flow rate (MFR) of 3 to 20 g/10 min at 190° C. and 2160 g;

a content of the alkali metal salt (B) in the barrier layer is 50 to 1500 ppm in terms of metal atoms; and the outer layers are made of a resin composition comprising an unmodified polypropylene (E) and a maleic anhydride-modified polypropylene (F) having a lower melt viscosity than that of the unmodified polypropylene (E).

Here, preferably, the unmodified polypropylene (E) has an MFR of 10 to 150 g/10 min at 230° C. and 2160 g, and the maleic anhydride-modified polypropylene (F) has an MFR of 150 to 750 g/10 min at 190° C. and 2160 g. Preferably, a mass ratio [F/(E+F)] of the maleic anhydride-modified polypropylene (F) to the total of the unmodified polypropylene (E) and the maleic anhydride-modified polypropylene (F) is 0.025 to 0.2. The alkali metal salt (B) is preferably sodium stearate or potassium stearate. Also, preferably, an MFR ratio (E/A) of the unmodified polypropylene (E) to the ethylene-vinyl alcohol copolymer (A) at 230° C./2160 g is 1 to 10.

Preferably, the barrier layer further comprises a thermoplastic resin (C) having a carbon-carbon double bond and at least one transition metal salt (D) selected from the group consisting of iron, nickel, copper, manganese and cobalt salts. More preferably, the thermoplastic resin (C) is polyoctenylene. A preferable embodiment of the present invention is a container made of the co-injection-molded multilayer structure.

The above problems can be also solved by providing a method for producing the multilayer structure, comprising co-injection molding the resin composition comprising the ethylene-vinyl alcohol copolymer (A) and the alkali metal salt (B), and the resin composition comprising the unmodified polypropylene (E) and the maleic anhydride-modified polypropylene (F).

The above problems can be also solved by providing a resin composition for co-injection molding, comprising an ethylene-vinyl alcohol copolymer (A) and an alkali metal salt (B) of a higher fatty acid having a melting point of 250° C. or lower, wherein the ethylene-vinyl alcohol copolymer (A) has an ethylene content of 20 to 60 mol %, a saponification degree of 90% or more, and a melt flow rate (MFR) of 3 to 20 g/10 min at 190° C. and 2160 g; and a content of the alkali metal salt (B) is 50 to 1500 ppm in terms of metal atoms.

Effects of the Invention

Although a co-injected multilayer structure of the present invention does not have an adhesive layer, a barrier layer made of an EVOH resin composition is highly adhesive to outer layers made of a polypropylene resin composition. Furthermore, a resin composition for co-injection molding of the present invention can provide a multilayer structure exhibiting such excellent interlayer adhesion.

MODES FOR CARRYING OUT THE INVENTION

The present invention relates to a co-injection-molded multilayer structure having a barrier layer and outer layers laminated on both sides of the barrier layer, wherein the barrier layer is made of a resin composition comprising an ethylene-vinyl alcohol copolymer (A) and an alkali metal salt (B) of a higher fatty acid having a melting point of 250° C. or lower;

the ethylene-vinyl alcohol copolymer (A) has an ethylene content of 20 to 60 mol %, a saponification degree of 90% or more, and a melt flow rate (MFR) of 3 to 20 g/10 min at 190° C. and 2160 g;

a content of the alkali metal salt (B) in the barrier layer is 50 to 1500 ppm in terms of metal atoms; and the outer layers are made of a resin composition comprising an unmodified polypropylene (E) and a maleic anhydride-modified polypropylene (F) having a lower melt viscosity than that of the unmodified polypropylene (E).

An EVOH (A) used in the present invention is preferably a saponification product of an ethylene-vinyl ester copolymer, particularly preferably a saponification product of an ethylene-vinyl acetate copolymer. An ethylene content of the EVOH (A) is 20 to 60 mol %. An ethylene content of 20 mol % or more allows for improving melt-moldability. An ethylene content is preferably 25 mol % or more. Meanwhile, an ethylene content of 60 mol % or less allows for improving barrier performance. An ethylene content is preferably 50 mol % or less, more preferably 40 mol % or less.

A saponification degree of the EVOH (A) is 90% or more. Here, a saponification degree is a proportion of vinyl alcohol units in the total of vinyl ester units and vinyl alcohol units contained in the EVOH (A). A saponification degree of 90% or more allows for improving barrier performance and thermostability during melt molding. A saponification degree is preferably 98% or more, more preferably 99% or more.

Copolymerization of ethylene with a vinyl ester can involve other monomers as copolymerization components. Examples of such monomers include α-olefins such as propylene, isobutylene, α-octene and α-dodecene; unsaturated acids such as acrylic acid, methacrylic acid, crotonic acid, maleic acid and itaconic acid, or anhydrides, salts or mono- or di-alkyl esters thereof; nitriles such as acrylonitrile and methacrylonitrile; amides such as acrylamide and methacrylamide; olefin-sulfonic acids such as ethylenesulfonic acid, allylsulfonic acid and methacrylsulfonic acid, or salts thereof; alkyl vinyl ethers; vinyl ketones; N-vinylpyrrolidone; vinyl chloride; and vinylidene chloride. However, a content of components derived from the other monomers is preferably 10 mol % or less, more preferably 5 mol % or less, further preferably 1 mol % or less.

The EVOH (A) has a melt flow rate (MFR) of 3 to 20 g/10 min at 190° C. and 2160 g. An MFR of 3 g/10 min or more allows for fast flowing during injection molding, and uniformly forming a barrier layer even to the end of a multilayer structure. An MFR is preferably 3.5 g/10 min or more, more preferably 4 g/10 min or more. An MFR of more than 20 g/10 min may lead to deterioration of strength of an EVOH (A) layer. An MFR is preferably 15 g/10 min or less, more preferably 13 g/10 min or less.

A barrier layer of the present invention is made of a resin composition comprising an EVOH (A) and an alkali metal salt (B) of a higher fatty acid having a melting point of 250° C. or lower. The alkali metal salt (B) has a melting point of 250° C. or lower and can be thus molten during melt molding. Here, a melt viscosity of the alkali metal salt (B) is much lower than that of the EVOH (A), so that the alkali metal salt (B) is concentrated in an interface with an adjacent layer by a shear force during injection molding. As a result, its interaction with maleic anhydride units in an adjacent polypropylene resin composition layer develops higher adhesion force. It is a major feature of the present invention, and a particular alkali metal salt (B) has been never added with such a concept.

An alkali metal salt (B) of a higher fatty acid having a melting point of 250° C. or lower is preferably a salt of a fatty acid having 12 to 30 carbon atoms. A larger carbon number contributes to achieving a melting point equal to or lower than 250° C. The carbon number is more preferably 14 or more, further preferably 16 or more. Preferable examples of a salt-forming fatty acid include saturated fatty acids such as lauric acid, myristic acid, palmitic acid, stearic acid, arachidic acid and behenic acid. An unsaturated fatty acid such as oleic acid and linoleic acid may be used, but in the light of thermostability, a saturated fatty acid is preferable and stearic acid is particularly preferable. A salt-forming metal species can be an alkali metal, preferably potassium or sodium, more preferably potassium in the light of further improvement in adhesiveness. Specifically, potassium stearate and sodium stearate are preferable, and potassium stearate is particularly preferable.

A content of an alkali metal salt (B) in the barrier layer is 50 to 1500 ppm in terms of metal atoms. If a content of the alkali metal salt (B) is less than 50 ppm in terms of metal atoms, adhesiveness is insufficiently improved. A content of the alkali metal salt (B) is preferably 100 ppm or more, more preferably 150 ppm or more in terms of metal atoms. If a content of the alkali metal salt (B) is more than 1500 ppm in terms of metal atoms, appearance of a molded article is deteriorated. A content of the alkali metal salt (B) is preferably 1000 ppm or less, more preferably 750 ppm or less, further preferably 500 ppm or less in terms of metal atoms.

There are no particular restrictions to a method for adding an alkali metal salt (B) to an EVOH (A); the EVOH (A) and the alkali metal salt (B) can be preliminarily melt-kneaded to give a resin composition which is then supplied for co-injection molding, or the EVOH (A) and the alkali metal salt (B) can be melt-kneaded by a co-injection molding machine. In the light of giving a uniform molded article, it is preferable to preliminarily conduct melt-kneading using an extruder, suitably a twin-screw extruder to give pellets, which are then supplied for co-injection molding.

Preferably, the barrier layer further contains a thermoplastic resin (C) having a carbon-carbon double bond and at least one transition metal salt (D) selected from the group consisting of iron, nickel, copper, manganese and cobalt salts. The presence of a transition metal salt (D) allows for easy oxidation of a carbon-carbon double bond contained in the thermoplastic resin (C), so that oxygen molecules passing through the barrier layer can be trapped and a very high level of oxygen barrier performance can be developed. The term "carbon-carbon double bond" as used herein does not include a double bond contained in an aromatic ring.

The amount of a carbon-carbon double bond contained in the thermoplastic resin (C) is preferably 0.001 to 0.02 mol/g. Double bonds contained in the thermoplastic resin (C) can be mutually separated by two methylenes like polybutadiene, but preferably, in the light of an oxygen-absorption efficiency, double bonds contained in the thermoplastic resin (C) are mutually separated by three or more methylenes. Among others, polyoctenylene is preferable. Polyoctenylene can be produced by ring-opening polymerization of cyclooctene. A preferable weight-average molecular weight of the thermoplastic resin (C) is 1,000 to 500,000. Such a thermoplastic resin (C) can be produced by, for example, the method described in Patent Reference No. 3.

The transition metal salt (D) is added for promoting an oxidation reaction of the thermoplastic resin (C). Examples of the transition metal salt (D) include iron, nickel, copper, manganese and cobalt salts. Among these, a cobalt salt is preferable. An anionic species in the transition metal salt (D) is preferably a carboxylic acid anion. Examples of such a carboxylic acid include, but not limited to, acetic acid, stearic acid, acetylacetone, dimethyldithiocarbamic acid, palmitic acid, 2-ethylhexanoic acid, neodecanoic acid, linoleic acid, tall oil acid, oleic acid, capric acid and naphthenic acid. Examples of a particularly preferable salt include cobalt stearate, cobalt 2-ethylhexanoate and cobalt neodecanoate. The transition metal salt (D) can have a polymeric counterion, that is, it can be a so-called ionomer.

A preferable content of the thermoplastic resin (C) is 1 to 30 parts by mass based on 100 parts by mass of the EVOH (A). A preferable content of the transition metal salt (D) in the barrier layer is 1 to 50,000 ppm in terms of metal elements. There are no particular restrictions to a method for adding the thermoplastic resin (C) and the transition metal salt (D), and preferably, they are added by melt-kneading them concurrently with the alkali metal salt (B).

A barrier layer of the present invention can contain an inorganic filler. A content of the inorganic filler is preferably 50% by mass or less, more preferably 20% by mass or less, further preferably 10% by mass or less. A further component other than the EVOH (A), the alkali metal salt (B), the thermoplastic resin (C), the transition metal salt (D) and the inorganic filler can be added, and its content is preferably 20% by mass or less, more preferably 10% by mass or less, further preferably 5% by mass or less.

The outer layers laminated on both sides of the barrier layer made of the EVOH resin composition are made of a resin composition containing an unmodified polypropylene (E) and a maleic anhydride-modified polypropylene (F) having a lower melt viscosity than that of the unmodified polypropylene (E). Since a melt viscosity of the maleic anhydride-modified polypropylene (F) is lower than that of the unmodified polypropylene (E), the maleic anhydride-modified polypropylene (F) is concentrated in an interface with the barrier layer by a shear force during injection molding. As a result, its interaction with alkali metal ions in the adjacent barrier layer develops higher adhesion force.

The unmodified polypropylene (E) is a polypropylene substantially consisting of hydrocarbon monomers which is not modified with a polar monomer. It can be, therefore, a homopolymer of propylene, or a copolymer copolymerized with ethylene in 5% by mass or less. The maleic anhydride-modified polypropylene (F) is a polypropylene modified with maleic anhydride which is a polar monomer. A polypropylene as a base of the maleic anhydride-modified polypropylene (F) can be also a homopolymer of propylene, or a copolymer copolymerized with ethylene in 5% by mass or less.

An MFR of the unmodified polypropylene (E) at 230° C. and 2160 g is preferably 10 to 150 g/10 min. The MFR of 10 g/10 min or more at 230° C. and 2160 g allows for easy injection molding. The MFR is preferably 20 g/10 min or more. Meanwhile, the MFR of 150 g/10 min or less at 230° C. and 2160 g allows for providing a molded article with a good appearance. The MFR is more preferably 100 g/10 min or less, further preferably 65 g/10 min or less.

An MFR of the maleic anhydride-modified polypropylene (F) at 190° C. and 2160 g is preferably 150 to 750 g/10 min. The MFR of 150 g/10 min or more at 190° C. and 2160 g allows for improving adhesiveness between the barrier layer and the outer layers. The MFR is more preferably 200 g/10 min or more. If the MFR at 190° C. and 2160 g is more than 750 g/10 min, a melt viscosity is so reduced that the maleic anhydride-modified polypropylene (F) cannot be produced.

It is preferable that a mass ratio [F/(E+F)] of the maleic anhydride-modified polypropylene (F) to the total of the unmodified polypropylene (E) and the maleic anhydride-modified polypropylene (F) is 0.025 to 0.2. The mass ratio [F/(E+F)] of 0.025 or more allows for improving adhesiveness between the barrier layer and the outer layers. The mass ratio [F/(E+F)] is more preferably 0.03 or more. If the mass ratio [F/(E+F)] is more than 0.2, appearance of a molded article obtained may be deteriorated. The mass ratio [F/(E+F)] is more preferably 0.13 or less, further preferably 0.08 or less.

Preferably, an MFR ratio (E/A) of the unmodified polypropylene (E) to the ethylene-vinyl alcohol copolymer (A) at 230° C./2160 g is 1 to 10. The MFR ratio (E/A) of 1 to 10 allows for producing a molded article with good appearance. The MFR ratio (E/A) is more preferably 6 or less, further preferably 3.5 or less.

There are no particular restrictions to a method for adding the unmodified polypropylene (E) and the maleic anhydride-modified polypropylene (F); the unmodified polypropylene (E) and the maleic anhydride-modified polypropylene (F) can be preliminarily melt-kneaded to give a resin composition, which is then supplied for co-injection molding, or the unmodified polypropylene (E) and the maleic anhydride-modified polypropylene (F) can be dry-blended to give mixed pellets, followed by melt-kneading in a co-injection molding machine.

For co-injection molding, a resin composition containing the ethylene-vinyl alcohol copolymer (A) and the alkali metal salt (B), and a resin composition containing the unmodified polypropylene (E) and the maleic anhydride-modified polypropylene (F) are co-injection molded, so that the former forms a barrier layer while the latter forms outer layers laminated on both sides of the barrier layer. Here, a further layer can be formed on the outer sides of the outer layers, but a preferable layer structure is a three-layer structure of outer layer/barrier layer/outer layer.

Injection timing of each resin composition can be appropriately adjusted, depending on the shape of a desired multilayer structure. First, injection of a composition for both (that is, inner and outer) outer layers is initiated, and then injection of a composition for the barrier layer is initiated, so that exposure of the barrier layer at the tip can be prevented. Furthermore, finally, only the outer layer composition is injected so that exposure of the barrier layer in a gate section can be also prevented. There are no particular restrictions to a temperature during injection molding as long as it is equal to or higher than a melting point of a resin used, and is equal to or higher than a melting point of the alkali metal salt (B).

A thickness ratio of the barrier layer to the outer layers is preferably, but not limited to, 1 to 20 when the total thickness of both outer layers is assumed to be 100. More preferably, it is 2 or more and it is 15 or less.

A co-injection-molded multilayer structure thus obtained can be used for various applications, such as a food container and an organic chemical container, to which barrier performance is required.

An EVOH resin composition used for the above co-injection-molded multilayer structure is novel in that it is used for co-injection molding. The problems of the present invention can be, therefore, also solved by providing a resin composition for co-injection molding, comprising an ethylene-vinyl alcohol copolymer (A) and an alkali metal salt (B) of a higher fatty acid having a melting point of 250° C. or lower, wherein the ethylene-vinyl alcohol copolymer (A) has an ethylene content of 20 to 60 mol %, a saponification degree of 90% or more, and a melt flow rate (MFR) of 3 to 20 g/10 min at 190° C. and 2160 g; and a content of the alkali metal salt (B) is 50 to 1500 ppm in terms of metal atoms.

EXAMPLES

There will be further described the present invention with reference to, but not limited to, Examples. Methods for evaluating a sample in Examples are as described below.
(1) Ethylene Content and Saponification Degree of an EVOH (A)

Determined by $^1$H-NMR spectrometry (measuring apparatus: JNM-GX-500, from JEOL Ltd.) using DMSO-ds as a solvent.
(2) Melt Flow Rate (MFR)

Determined by measuring an output rate (g/10 min) of a sample under the conditions of a temperature of 190° C. or 230° C. and a load of 2160 g, using a melt indexer (L244, from Takara Kogyo).

(3) Melting Point (Tm)

A melting point (Tm) was determined in accordance with JIS K 7121, using a differential scanning calorimeter (DSC) (Q2000, from TA Instruments, Inc.).
(4) Oxygen Transmission Rate (OTR)

An oxygen transmission rate (OTR) was measured for a 20 μm monolayer film obtained, under the conditions of 20° C. and 85% RH in accordance with ISO14663-2 using an oxygen transmission rate measuring apparatus (OX-Tran2/20, from Modern Control Inc.) after moisture conditioning under the conditions of 20° C. and 85% RH.
(5) Appearance Appearance of a co-injection-molded multilayer structure obtained was evaluated on a scale of 1 to 10 by the following criteria.

1: A multilayer structure was not formed into a cup shape.
2: A part of a multilayer structure was defective.
3: A multilayer structure was formed into a cup, but a flow mark is prominently observed.
4: A flow mark was observed.
5: A minor flow mark was observed and streaks were prominently observed.
6: No flow marks were observed, but streaks were prominently observed.
7: Streaks were observed.
8: Minor streaks were observed.
9: No streaks were observed, but minor defects were observed.
10: No defects were observed in appearance.
(6) Presence Ratio of an EVOH Layer in a Flange A flange in a co-injection-molded multilayer structure obtained was removed and then the cup was immersed in an aqueous solution of iodine. After the cup was removed from the aqueous solution, a length of a part stained by iodine was measured, and a presence ratio of the EVOH layer in the flange was calculated from a proportion of the iodine-stained part to the whole circumference in accordance with the following formula.

$$\text{Length of an iodine-stained part in a cup cross-section (cm)/the whole circumference (cm)} \times 100$$

(7) Adhesion Strength

A co-injection-molded multilayer structure obtained was pressed 10 times by hand (squeezed), and delamination status was evaluated on a scale of 1 to 10 by the following criteria. A delamination degree is reduced as the number increases from 1 to 10.

1: Delamination was observed before pressing, and delamination became larger by one press.
2: Delamination was not observed before pressing, but delamination occurred by pressing once or twice.
3: Delamination occurred by pressing three times.
4: Delamination occurred by pressing four times.
5: Delamination occurred by pressing five times.
6: Delamination occurred by pressing six times.
7: Delamination occurred by pressing seven times.
8: Delamination occurred by pressing eight times.
9: Delamination occurred by pressing nine times.
10: Delamination was not observed even by pressing ten times by hand.
(8) Food Storage Test Oil marinated tuna was placed in a co-injection-molded multilayer structure which had been pressed 10 times by hand, and then the container was covered with an aluminum-layer containing laminate film (CPP/dry/Al/dry/ONy/dry/PET=50 μm/2 μm/7 μm/2 μm/15 μm/2 μm/12 μm). Here, "CPP", "dry", "Al", "ONy" and "PET" refer to a nonoriented polypropylene film, an adhesive for dry lamination, an aluminum foil, a biaxially oriented nylon film, and a biaxially oriented polyethylene terephthalate film, respectively. This multilayer structure was retort-treated at 120° C. for 30 min using a retorting apparatus (high-temperature high-pressure cooking sterilizing tester" RCS-60/10RSPXG-FAM", from Hisaka Works, Ltd.), and was then subjected to a six-month storage test under the conditions of 20° C. and 65% RH. Appearance change during 6-month storage was evaluated on a scale of 1 to 10 by the following criteria. A discoloration degree is reduced as the number increases from 1 to 10.

1: Discoloration occurred immediately after retort treatment.
2: Discoloration was initiated at 1 month.
3: Discoloration was initiated at 1.5 months.
4: Discoloration was initiated at 2 months.
5: Discoloration was initiated at 2.5 months.
6: Discoloration was initiated at 3 months.
7: Discoloration was initiated at 3.5 months.
8: Discoloration was initiated at 4 months.
9: Discoloration was initiated at 5 months.
10: Discoloration was not observed even at 6 months.

[Polypropylene Resin Brands]

In Examples, an unmodified polypropylene (E) and a maleic anhydride-modified polypropylene (F) used were as follows.

[Unmodified Polypropylene (E)]

Polypropylene copolymer TI6500WV MFR=50 g/10 min (230° C., load: 2160 g) from Braskem Inc.
Polypropylene copolymer MOPLEN RP398T MFR=40 g/10 min (230° C., load: 2160 g) from Lyondell Basell Industries
Polypropylene copolymer MOPLEN RP2803 MFR=71 g/10 min (230° C., load: 2160 g) from Lyondell Basell Industries
Polypropylene homopolymer CP1200B MFR=126 g/10 min (230° C., load: 2160 g) from Braskem Inc.

[Maleic Anhydride-Modified Polypropylene (F)]

Bynel50E803 MFR=470 g/10 min (190° C., load: 2160 g) from E.I. du Pont de Nemours and Company
Bynel50E806 MFR=25 g/10 min (190° C., load: 2160 g) from E.I. du Pont de Nemours and Company
ALP-067 MFR=170 g/10 min (190° C., load: 2160 g) from EVAL EUROPE N. V.

Example 1

To an EVOH rein (EVAL F104B, from Kuraray Co., Ltd.) (hereinafter, referred to as "EVOH1") having an ethylene content of 32 mol %, a saponification degree of 99 mol % or more, an MFR of 4.4 g/10 min (190° C., load: 2160 g) and an OTR of 2.0 cc·20 μm/mz·day·atm (20° C./85% RH) was blended potassium stearate as an alkali metal salt (B) of a higher fatty acid in 1500 ppm (182 ppm in terms of metal atoms), and then the mixture was melt-kneaded, pelletized and dried under the conditions below, to give pellets of an EVOH resin composition. A melting point of potassium stearate is 240° C.

Apparatus: 26 mmφ twin screw extruder (Labo Plastomill 15C300, from Toyo Seiki Seisaku-sho, Ltd.)
L/D: 25
Screw: equi-directional complete meshing type
Die hole number: 2 holes (3 mmφ)
Extrusion temperature (° C.): C1=200, C2 to C5=240, Die=240
Screw revolution: 100 rpm
Output rate: about 5 kg/hr
Drying: hot-air dryer 80° C.16 hr Using the EVOH resin composition pellets obtained, film-deposition was conducted under the conditions below to give a monolayer film with a thickness of 20 μm, for which an oxygen transmission rate (OTR) was measured in accordance with the above method.

Apparatus: 20 mmφ single screw extruder (Labo Plastomill 150300, from Toyo Seiki Seisaku-sho, Ltd.)
L/D: 20
Screw: full flight
Die: 300 mm coat hanger die
Extrusion temperature (° C.): C1=180, C2 to C3=200, Die=200
Screen: 50/100/50
Cooling roller temperature: 20° C.
Screw revolution: 40 rpm
Winding rate: 3.0 to 3.5 m/min Meanwhile, 95 parts by mass of TI6500MV (MFR=50 g/10 min (230° C., load: 2160 g)) from Braskem Inc., as a polypropylene (E) and 5 parts by mass of Bynel50E803 (MFR=470 g/10 min (190° C., load: 2160 g)) from E.I. du Pont de Nemours and Company as a maleic anhydride-modified polypropylene (F) were dry-blended, to give mixed polypropylene pellets containing polypropylene (E) pellets and maleic anhydride-modified polypropylene (F) pellets.

Using the EVOH resin composition pellets and the mixed polypropylene pellets thus obtained, co-injection molding was conducted under the conditions below, to give a co-injection-molded multilayer structure.

Apparatus: co-injection molding machine SYN-ERGY3000. from Nestal Machine Inc.
Screw diameter
  EVOH resin composition: 18 mmφ
  Polypropylene resin composition: 28 mmφ
Hot runner: Kortec, Inc.
Mold: cup shape in which an opening is a circle with a diameter of 95 mm, a bottom is a circle with a diameter of 69 mm, a height is 40 mm and a thickness is 800 μm, and which has a flange around the opening.
EVOH resin composition/polypropylene resin composition=9/91 (mass ratio)
Temperature conditions
  EVOH resin composition: Zone 1=220° C., Zone 2=245° C., Zone 3=255° C.
  Polypropylene resin composition: Zone 1=260° C., Zone 2=260° C., Zone 3=255° C., Zone 4=250° C., Zone 5=230° C.
  Manifold: 255° C.
Cycle time: 8.5 sec
Cooling time: 1 sec For the co-injection-molded multilayer structure obtained, an appearance, a presence ratio of the EVOH layer in the flange and an adhesion strength were determined and a food preservation test was conducted as described above. The results are shown in Table 1.

Example 2

An EVOH resin composition, mixed polypropylene pellets, a monolayer film and a co-injection-molded multilayer structure were produced as described in Example 1, substituting an EVOH resin with an ethylene content of 35 mol %, a saponification degree of 99 mol % or more, an MFR of 9.3 g/10 min (190° C., load: 2160 g), an OTR of 2.6 cc·20 μm/m²·day·atm (20° C./85% RH) (EVAL C109B, from Kuraray Co., Ltd.) (hereinafter, referred to as "EVOH2"), for EVOH1. The monolayer film and the co-injection-molded multilayer structure obtained were evaluated as described in Example 1, and the results are shown in Table 1.

Example 3

An EVOH resin composition, mixed polypropylene pellets, a monolayer film and a co-injection-molded multilayer structure were produced as described in Example 1, except that MOPLEN RP398T (MFR=40 g/10 min (230° C., load: 2160 g)) from Lyondell Basell Industries was used as a polypropylene (E). The monolayer film and the co-injection-molded multilayer structure thus obtained were evaluated as described in Example 1, and the results are shown in Table 1.

Example 4

An EVOH resin composition, mixed polypropylene pellets, a monolayer film and a co-injection-molded multilayer structure were produced as described in Example 1, except that MOPLEN RP2803 (71 g/10 min (230° C., load: 2160 g)) from Lyondell Basell Industries was used as a polypropylene (E). The monolayer film and the co-injection-molded multilayer structure thus obtained were evaluated as described in Example 1, and the results are shown in Table 1.

Example 5

An EVOH resin composition, mixed polypropylene pellets, a monolayer film and a co-injection-molded multilayer structure were produced as described in Example 1, except that CP1200B (MFR=126 g/10 min (230° C., load: 2160 g)) from Braskem Inc. was used as a polypropylene (E). The monolayer film and the co-injection-molded multilayer structure thus obtained were evaluated as described in Example 1, and the results are shown in Table 1.

Example 6

An EVOH resin composition, mixed polypropylene pellets, a monolayer film and a co-injection-molded multilayer structure were produced as described in Example 1, except that ByneI50E806 (MFR=25 g/10 min (190° C., load: 2160 g)) from E.I. du Pont de Nemours and Company was used as a maleic anhydride-modified polypropylene (F). The monolayer film and the co-injection-molded multilayer structure thus obtained were evaluated as described in Example 1, and the results are shown in Table 1.

Example 7

An EVOH resin composition, mixed polypropylene pellets, a monolayer film and a co-injection-molded multilayer structure were produced as described in Example 1, except that ALP-067 (MFR=170 g/10 min (190° C., load: 2160 g)) from EVAL EUROPE N. V. was used as a maleic anhydride-modified polypropylene (F). The monolayer film and the co-injection-molded multilayer structure thus obtained were evaluated as described in Example 1, and the results are shown in Table 1.

Example 8

An EVOH resin composition, mixed polypropylene pellets, a monolayer film and a co-injection-molded multilayer structure were produced as described in Example 1, except that a mixing ratio of potassium stearate to EVOH1 was 500 ppm (61 ppm in terms of metal atoms). The monolayer film and the co-injection-molded multilayer structure thus obtained were evaluated as described in Example 1, and the results are shown in Table 1.

Example 9

An EVOH resin composition, mixed polypropylene pellets, a monolayer film and a co-injection-molded multilayer structure were produced as described in Example 1, except that a mixing ratio of potassium stearate to EVOH1 was 10000 ppm (1212 ppm in terms of metal atoms). The monolayer film and the co-injection-molded multilayer structure thus obtained were evaluated as described in Example 1, and the results are shown in Table 1.

Example 10

An EVOH resin composition, mixed polypropylene pellets, a monolayer film and a co-injection-molded multilayer structure were produced as described in Example 1, except that a mixing ratio of potassium stearate to EVOH1 was 1000 ppm (121 ppm in terms of metal atoms). The monolayer film and the co-injection-molded multilayer structure thus obtained were evaluated as described in Example 1, and the results are shown in Table 1.

Example 11

An EVOH resin composition, mixed polypropylene pellets, a monolayer film and a co-injection-molded multilayer structure were produced as described in Example 1, except that a mixing ratio of potassium stearate to EVOH1 was 7500 ppm (909 ppm in terms of metal atoms). The monolayer film and the co-injection-molded multilayer structure thus obtained were evaluated as described in Example 1, and the results are shown in Table 2.

Example 12

An EVOH resin composition, mixed polypropylene pellets, a monolayer film and a co-injection-molded multilayer structure were produced as described in Example 1, except that a mixing ratio of potassium stearate to EVOH1 was 2000 ppm (242 ppm in terms of metal atoms). The monolayer film and the co-injection-molded multilayer structure thus obtained were evaluated as described in Example 1, and the results are shown in Table 2.

Example 13

An EVOH resin composition, mixed polypropylene pellets, a monolayer film and a co-injection-molded multilayer structure were produced as described in Example 1, except that a mixing ratio of potassium stearate to EVOH1 was 5000 ppm (606 ppm in terms of metal atoms). The monolayer film and the co-injection-molded multilayer structure thus obtained were evaluated as described in Example 1, and the results are shown in Table 2.

Example 14

An EVOH resin composition, mixed polypropylene pellets, a monolayer film and a co-injection-molded multilayer structure were produced as described in Example 1, except that sodium stearate as an alkali metal salt (B) of a higher fatty acid was blended in a ratio of 1500 ppm (109 ppm in terms of metal atoms) to EVOH1. The monolayer film and the co-injection-molded multilayer structure thus obtained were evaluated as described in Example 1, and the results are shown in Table 2. A melting point of sodium stearate is 220° C.

Example 15

The atmosphere of a 5-liter three-necked flask equipped with a stirrer and a thermometer was substituted with nitrogen. In the flask were charged 110 g (1.0 mol) of cyclooctene and 187 mg (1.7 mmol) of cis-4-octene in heptane (the solution: 624 g). Then, a catalyst solution was prepared by dissolving 8.48 mg (10 μmol) of benzylidene (1,3-dimesitylimidazolidin-2-ylidene)(tricyclohexylphosphine)ruthenium dichloride in 1 g of toluene, and was added to the above heptane solution, and then ring-opening metathesis polymerization was initiated at 70° C. After 5 min, gas chromatographic analysis ("GC-14B" from Shimadzu Corporation, Column: "G-100" from Chemicals Inspection & Testing Inst., Japan) demonstrated disappearance of cyclooctene. To the reaction solution was added 600 g of methanol, and the mixture was stirred at 40° C. for 30 min. By standing at 40° C. for one hour, the mixture was separated into phases and the lower phase was discarded. To the upper phase was again added 600 g of methanol, and the mixture was stirred at 40° C. for 30 min. By standing at 40° C. for one hour, the mixture was separated into phases and the lower phase was discarded. The upper phase was evaporated under a reduced pressure to remove low-boiling components such as heptane. The residue was dried at 50 Pa and 40° C. for 24 hours using a vacuum oven, to give 101.2 g (yield: 90%) of a polyoctenylene in which a weight-average molecular weight was 158,000 and a content of oligomers with a molecular weight of 1,000 or less was 8.5% by mass.

For the polyoctenylene obtained, a ratio of carbon-carbon double bonds in side chains to the whole carbon-carbon double bonds was 0%. Here, the ratio based on the whole carbon-carbon double bonds is calculated as $100 \times b/(a+b)$, where the amount of carbon-carbon double bonds in the main chain is a (mol/g) and the amount of carbon-carbon double bonds in side chains is b (mol/g).

The whole polyoctenylene obtained was crushed into a size of about 1 mm³ and placed in a 500 mL separable flask equipped with a stirrer, a reflux condenser and a thermometer. After 300 g of acetone was added, the mixture was stirred at 40° C. for 3 hours. After acetone was removed by decantation, 300 g of acetone was again added, and the mixture was stirred at 40° C. for 3 hours. After acetone was removed by decantation, the residue was dried at 50 Pa and 100° C. for 6 hours using a vacuum oven, to give 96.1 g of polyoctenylene (C-1) in which a weight-average molecular weight was 163,000 and a content of oligomers having a molecular weight of 1,000 or less was 3.1% by mass.

EVOH1, polyoctenylene (C-1), cobalt stearate and potassium stearate were melt-kneaded, pelletized and dried under the conditions described below, to give pellets of a EVOH resin composition (hereinafter, referred to as "EVOH3"). EVOH3 contains 92% by mass of EVOH, 8% by mass of polyoctenylene (C-1), 2121 ppm of cobalt stearate and 1500 ppm (182 ppm in terms of metal atoms) of potassium stearate. For EVOH3, an ethylene content was 32 mol %, a saponification degree was 99 mol % or more, an MFR was 5.2 g/10 min (190° C., load: 2160 g), and an OTR was below a detection limit.

Apparatus: 26 mmφ twin screw extruder (Labo Plastomill 15C300, from Toyo Seiki Seisaku-sho, Ltd.)
L/D: 25
Screw: equi-directional complete meshing type
Die hole number: 2 holes (3 mmφ)
Extrusion temperature (° C.): C1=200, C2 to C5=240, Die=240
Screw revolution: 100 rpm
Output rate: about 5 kg/hr
Drying: hot-air dryer 80° C./6 hr Mixed polypropylene pellets, a monolayer film and a co-injection-molded multilayer structure were produced as described in Example 1, except that EVOH3 thus obtained was used for co-injection molding. The monolayer film and the co-injection-molded multilayer structure thus obtained were evaluated as described in Example 1, and the results are shown in Table 2.

Example 16

An EVOH resin composition, mixed polypropylene pellets, a monolayer film and a co-injection-molded multilayer structure were produced as described in Example 1, except that a mass ratio [F/(E+F)] of the maleic anhydride-modified polypropylene (F) to the total of an unmodified polypropylene (E) and the maleic anhydride-modified polypropylene (F) was 0.0125. The monolayer film and the co-injection-molded multilayer structure thus obtained were evaluated as described in Example 1, and the results are shown in Table 2.

Example 17

An EVOH resin composition, mixed polypropylene pellets, a monolayer film and a co-injection-molded multilayer structure were produced as described in Example 1, except that a mass ratio [F/(E+F)] of the maleic anhydride-modified polypropylene (F) to the total of the unmodified polypropylene (E) and the maleic anhydride-modified polypropylene (F) was 0.15. The monolayer film and the co-injection-molded multilayer structure thus obtained were evaluated as described in Example 1, and the results are shown in Table 2.

Example 18

An EVOH resin composition, mixed polypropylene pellets, a monolayer film and a co-injection-molded multilayer structure were produced as described in Example 1, except that a mass ratio [F/(E+F)] of the maleic anhydride-modified polypropylene (F) to the total of the unmodified polypropylene (E) and the maleic anhydride-modified polypropylene (F) was 0.025. The monolayer film and the co-injection-molded multilayer structure thus obtained were evaluated as described in Example 1, and the results are shown in Table 2.

Example 19

An EVOH resin composition, mixed polypropylene pellets, a monolayer film and a co-injection-molded multilayer structure were produced as described in Example 1, except that a mass ratio [F/(E+F)] of the maleic anhydride-modified polypropylene (F) to the total of the unmodified polypropylene (E) and the maleic anhydride-modified polypropylene (F) was 0.10. The monolayer film and the co-injectionmolded multilayer structure thus obtained were evaluated as described in Example 1, and the results are shown in Table 2.

Example 20

An EVOH resin composition, mixed polypropylene pellets, a monolayer film and a co-injection-molded multilayer structure were produced as described in Example 1, except that a mass ratio [F/(E+F)] of the maleic anhydride-modified polypropylene (F) to the total of the unmodified polypropylene (E) and the maleic anhydride-modified polypropylene (F) was 0.075. The monolayer film and the co-injection-molded multilayer structure thus obtained were evaluated as described in Example 1, and the results are shown in Table 2.

Comparable Example 1

Mixed polypropylene pellets, a monolayer film and a co-injection-molded multilayer structure were produced as described in Example 1, substituting EVOH1 for an EVOH resin composition. The monolayer film and the co-injection-molded multilayer structure thus obtained were evaluated as described in Example 1, and the results are shown in Table 3.

Comparable Example 2

An EVOH resin composition, mixed polypropylene pellets, a monolayer film and a co-injection-molded multilayer structure were produced as described in Example 1, except that 500 ppm of potassium acetate (199 ppm in terms of metal atoms) in place of potassium stearate was blended with EVOH1. The monolayer film and the co-injection-molded multilayer structure thus obtained were evaluated as described in Example 1, and the results are shown in Table 3. Potassium acetate does not have a melting point detectable by DSC and is decomposed at a temperature over 250° C.

Comparable Example 3

An EVOH resin composition, mixed polypropylene pellets, a monolayer film and a co-injection-molded multilayer structure were produced as described in Example 1, except that 500 ppm of potassium succinate (201 ppm in terms of metal atoms) in place of potassium stearate was blended with EVOH1. The monolayer film and the co-injection-molded multilayer structure thus obtained were evaluated as described in Example 1, and the results are shown in Table 3. Potassium succinate does not have a melting point detectable by DSC and is decomposed at a temperature over 250° C.

Comparable Example 4

Mixed polypropylene pellets, a monolayer film and a co-injection-molded multilayer structure were produced as described in Comparative Example 1, substituting an EVOH resin having an ethylene content of 32 mol %, a saponification degree of 99 mol % or more, an MFR of 1.6 g/10 min (190° C., load: 2160 g) and an OTR of 2.0 cc·20 μm/m²·day·atm (20° C./85% RH) (EVAL F101B, from Kuraray Co., Ltd.) (hereinafter, referred to as "EVOH4") for the EVOH resin composition. The monolayer film and the co-injection-molded multilayer structure thus obtained were evaluated as described in Example 1, and the results are shown in Table 3.

Comparable Example 5

An EVOH resin composition, mixed polypropylene pellets, a monolayer film and a co-injection-molded multilayer structure were produced as described in Example 1, substituting EVOH4 for EVOH1. The monolayer film and the co-injection-molded multilayer structure thus obtained were evaluated as described in Example 1, and the results are shown in Table 3.

Comparable Example 6

Mixed polypropylene pellets, a monolayer film and a co-injection-molded multilayer structure were produced as described in Comparative Example 1, substituting an EVOH resin having an ethylene content of 32 mol %, a saponification degree of 99 mol % or more, an MFR of 4.9 g/10 min (190° C., load: 2160 g) and an OTR of 4.9 cc·20 μm/m²·day·atm (20° C./85% RH) (EVAL SP434B, from Kuraray Co., Ltd.) (hereinafter, referred to as "EVOH5") for the EVOH resin composition. The monolayer film and the co-injection-molded multilayer structure thus obtained were evaluated as described in Example 1, and the results are shown in Table 3.

Comparable Example 7

Mixed polypropylene pellets, a monolayer film and a co-injection-molded multilayer structure were produced as described in Example 1, substituting EVOH5 for EVOH1. The monolayer film and the co-injection-molded multilayer structure thus obtained were evaluated as described in Example 1, and the results are shown in Table 3.

Comparable Example 8

Mixed polypropylene pellets, a monolayer film and a co-injection-molded multilayer structure were produced as described in Comparative Example 1, substituting an EVOH resin having an ethylene content of 44 mol %, a saponification degree of 99 mol % or more, an MFR of 5.5 g/10 min (190° C., load: 2160 g) and an OTR of 8.4 cc·20 μm/m²·day·atm (20° C./85% RH) (EVAL SP295B, from Kuraray Co., Ltd.) (hereinafter, referred to as "EVOH6") for the EVOH resin composition. The monolayer film and the co-injection-molded multilayer structure thus obtained were evaluated as described in Example 1, and the results are shown in Table 3.

Comparable Example 9

Mixed polypropylene pellets, a monolayer film and a co-injection-molded multilayer structure were produced as described in Example 1, substituting EVOH6 for EVOH1. The monolayer film and the co-injection-molded multilayer structure thus obtained were evaluated as described in Example 1, and the results are shown in Table 3.

TABLE 1

|  |  |  | Example 1 | Example 2 | Example 3 | Example 4 | Example 5 | Example 6 |
|---|---|---|---|---|---|---|---|---|
| EVOH (A) | Type |  | EVOH1 | EVOH2 | EVOH1 | EVOH1 | EVOH1 | EVOH1 |
|  | Ethylene content | mol % | 32 | 35 | 32 | 32 | 32 | 32 |
|  | MFR (190° C.) | g/10 min | 4.4 | 9.3 | 4.4 | 4.4 | 4.4 | 4.4 |
|  | MFR (230° C.) | g/10 min | 18 | 42 | 18 | 18 | 18 | 18 |
|  | OTR | *1) | 2.0 | 2.6 | 2.0 | 2.0 | 2.0 | 2.0 |
| Alkali metal salt (B) | Type |  | Potassium stearate | Potassium stearate | Potassium stearate | Potassium stearate | Potassium stearate | Potassium stearate |
|  | Melting point | ° C. | 240 | 240 | 240 | 240 | 240 | 240 |
|  | Content (salt) | ppm | 1500 | 1500 | 1500 | 1500 | 1500 | 1500 |
|  | Content (metal) | ppm | 182 | 182 | 182 | 182 | 182 | 182 |
| PP (E) | MFR (230° C.) | g/10 min | 50 | 50 | 40 | 71 | 126 | 50 |
| MAh-PP (F) | MFR (190° C.) | g/10 min | 470 | 470 | 470 | 470 | 470 | 25 |
| Mass ratio [F/(E + F)] |  |  | 0.05 | 0.05 | 0.05 | 0.05 | 0.05 | 0.05 |
| MFR ratio (E)/(A) |  |  | 2.8 | 1.2 | 2.2 | 3.9 | 7.0 | 2.8 |
| Presence ratio of an EVOH layer |  | % | 100 | 100 | 100 | 95 | 90 | 100 |
| Appearance |  |  | 10 | 10 | 10 | 8 | 6 | 10 |
| Adhesion strength |  |  | 9 | 9 | 9 | 9 | 9 | 6 |
| Food storage test |  |  | 8 | 8 | 8 | 8 | 8 | 8 |

|  |  |  | Example 7 | Example 8 | Example 9 | Example 10 |
|---|---|---|---|---|---|---|
| EVOH (A) | Type |  | EVOH1 | EVOH1 | EVOH1 | EVOH1 |
|  | Ethylene content | mol % | 32 | 32 | 32 | 32 |
|  | MFR (190° C.) | g/10 min | 4.4 | 4.4 | 4.4 | 4.4 |
|  | MFR (230° C.) | g/10 min | 18 | 18 | 18 | 18 |
|  | OTR | *1) | 2.0 | 2.0 | 2.0 | 2.0 |
| Alkali metal salt (B) | Type |  | Potassium stearate | Potassium stearate | Potassium stearate | Potassium stearate |
|  | Melting point | ° C. | 240 | 240 | 240 | 240 |
|  | Content (salt) | ppm | 1500 | 500 | 10000 | 1000 |
|  | Content (metal) | ppm | 182 | 61 | 1212 | 121 |
| PP (E) | MFR (230° C.) | g/10 min | 50 | 50 | 50 | 50 |
| MAh-PP (F) | MFR (190° C.) | g/10 min | 170 | 470 | 470 | 470 |
| Mass ratio [F/(E + F)] |  |  | 0.05 | 0.05 | 0.05 | 0.05 |
| MFR ratio (E)/(A) |  |  | 2.8 | 2.8 | 2.8 | 2.8 |
| Presence ratio of an EVOH layer |  | % | 100 | 100 | 100 | 100 |
| Appearance |  |  | 10 | 10 | 6 | 10 |
| Adhesion strength |  |  | 7 | 7 | 10 | 8 |
| Food storage test |  |  | 8 | 8 | 8 | 8 |

*1) cc · 20 μm/m² · day · atm

TABLE 2

|  |  |  | Example 11 | Example 12 | Example 13 | Example 14 | Example 15 |
|---|---|---|---|---|---|---|---|
| EVOH (A) | Type |  | EVOH1 | EVOH1 | EVOH1 | EVOH1 | EVOH3 |
|  | Ethylene content | mol % | 32 | 32 | 32 | 32 | 32 |
|  | MFR (190° C.) | g/10 min | 4.4 | 4.4 | 4.4 | 4.4 | 5.2 |
|  | MFR (230° C.) | g/10 min | 18 | 18 | 18 | 18 | 19 |
|  | OTR | *1) | 2.0 | 2.0 | 2.0 | 2.0 | *2) |
| Alkali metal salt (B) | Type |  | Potassium stearate | Potassium stearate | Potassium stearate | Sodium stearate | Potassium stearate |
|  | Melting point | ° C. | 240 | 240 | 240 | 220 | 240 |
|  | Content (salt) | ppm | 7500 | 2000 | 5000 | 1500 | 1500 |
|  | Content (metal) | ppm | 909 | 242 | 606 | 109 | 182 |
| PP (E) | MFR (230° C.) | g/10 min | 50 | 50 | 50 | 50 | 50 |
| MAh-PP (F) | MFR (190° C.) | g/10 min | 470 | 470 | 470 | 470 | 470 |
| Mass ratio [F/(E + F)] |  |  | 0.05 | 0.05 | 0.05 | 0.05 | 0.05 |
| MFR ratio (E)/(A) |  |  | 2.8 | 2.8 | 2.8 | 2.8 | 2.6 |
| Presence ratio of an EVOH layer |  | % | 100 | 100 | 100 | 100 | 100 |
| Appearance |  |  | 7 | 10 | 9 | 10 | 10 |
| Adhesion strength |  |  | 10 | 9 | 9 | 7 | 10 |
| Food storage test |  |  | 8 | 8 | 8 | 8 | 10 |

|  |  |  | Example 16 | Example 17 | Example 18 | Example 19 | Example 20 |
|---|---|---|---|---|---|---|---|
| EVOH (A) | Type |  | EVOH1 | EVOH1 | EVOH1 | EVOH1 | EVOH1 |
|  | Ethylene content | mol % | 32 | 32 | 32 | 32 | 32 |
|  | MFR (190° C.) | g/10 min | 4.4 | 4.4 | 4.4 | 4.4 | 4.4 |
|  | MFR (230° C.) | g/10 min | 18 | 18 | 18 | 18 | 18 |
|  | OTR | *1) | 2.0 | 2.0 | 2.0 | 2.0 | 2.0 |

TABLE 2-continued

| | | | | | | | |
|---|---|---|---|---|---|---|---|
| Alkali metal salt (B) | Type | | Potassium stearate | Potassium stearate | Potassium stearate | Potassium stearate | Potassium stearate |
| | Melting point | °C. | 240 | 240 | 240 | 240 | 240 |
| | Content (salt) | ppm | 1500 | 1500 | 1500 | 1500 | 1500 |
| | Content (metal) | ppm | 182 | 182 | 182 | 182 | 182 |
| PP (E) | MFR (230° C.) | g/10 min | 50 | 50 | 50 | 50 | 50 |
| MAh-PP (F) | MFR (190° C.) | g/10 min | 470 | 470 | 470 | 470 | 470 |
| Mass ratio [F/(E + F)] | | | 0.0125 | 0.15 | 0.025 | 0.1 | 0.075 |
| MFR ratio (E)/(A) | | | 2.8 | 2.8 | 2.8 | 2.8 | 2.8 |
| Presence ratio of an EVOH layer | | % | 100 | 100 | 100 | 100 | 100 |
| Appearance | | | 10 | 8 | 10 | 9 | 10 |
| Adhesion strength | | | 6 | 10 | 7 | 9 | 8 |
| Food storage test | | | 8 | 8 | 8 | 8 | 8 |

*1) cc · 20 μm/m² · day · atm
*2) below a detection limit

TABLE 3

| | | | Comparative Example 1 | Comparative Example 2 | Comparative Example 3 | Comparative Example 4 | Comparative Example 5 |
|---|---|---|---|---|---|---|---|
| EVOH (A) | Type | | EVOH1 | EVOH1 | EVOH1 | EVOH4 | EVOH4 |
| | Ethylene content | mol % | 32 | 32 | 32 | 32 | 32 |
| | MFR (190° C.) | g/10 min | 4.4 | 4.4 | 4.4 | 1.6 | 1.6 |
| | MFR (230° C.) | g/10 min | 18 | 18 | 18 | 6.3 | 6.3 |
| | OTR | *1) | 2.0 | 2.0 | 2.0 | 2.0 | 2.0 |
| Alkali metal salt (B) | Type | | — | — | Potassium succinate | — | Potassium stearate |
| | Melting point | °C. | — | *3) | — | — | — |
| | Content (salt) | ppm | — | 500 | — | — | — |
| | Content (metal) | ppm | — | 199 | — | — | — |
| PP (E) | MFR (230° C.) | g/10 min | 50 | 50 | 50 | 50 | 50 |
| MAh-PP (F) | MFR (190° C.) | g/10 min | 470 | 470 | 470 | 470 | 470 |
| Mass ratio [F/(E + F)] | | | 0.05 | 0.05 | 0.05 | 0.05 | 0.05 |
| MFR ratio (E)/(A) | | | 2.8 | 2.8 | 2.8 | 7.9 | 7.9 |
| Presence ratio of an EVOH layer | | % | 100 | 100 | 100 | 50 | 50 |
| Appearance | | | 10 | 10 | 10 | 4 | 4 |
| Adhesion strength | | | 2 | 4 | 4 | 2 | 8 |
| Food storage test | | | 6 | 6 | 6 | 4 | 4 |

| | | | | Comparative Example 6 | Comparative Example 7 | Comparative Example 8 | Comparative Example 9 |
|---|---|---|---|---|---|---|---|
| | EVOH (A) | Type | | EVOH5 | EVOH5 | EVOH6 | EVOH6 |
| | | Ethylene content | mol % | 32 | 32 | 44 | 44 |
| | | MFR (190° C.) | g/10 min | 4.9 | 4.9 | 5.5 | 5.5 |
| | | MFR (230° C.) | g/10 min | 20 | 20 | 12 | 12 |
| | | OTR | *1) | 4.9 | 4.9 | 8.4 | 8.4 |
| | Alkali metal salt (B) | Type | | — | Potassium stearate | — | Potassium stearate |
| | | Melting point | °C. | — | — | — | 240 |
| | | Content (salt) | ppm | — | — | — | 1500 |
| | | Content (metal) | ppm | — | — | — | 182 |
| | PP(E) | MFR (230° C.) | g/10 min | 50 | 50 | 50 | 50 |
| | MAh-PP (F) | MFR (190° C.) | g/10 min | 470 | 470 | 470 | 470 |
| | Mass ratio [F/(E + F)] | | | 0.05 | 0.05 | 0.05 | 0.05 |
| | MFR ratio (E)/(A) | | | 2.5 | 2.5 | 4.2 | 4.2 |
| | Presence ratio of an EVOH layer | | % | 100 | 100 | 100 | 100 |
| | Appearance | | | 10 | 10 | 10 | 10 |
| | Adhesion strength | | | 4 | 8 | 4 | 8 |
| | Food storage test | | | 4 | 4 | 4 | 4 |

*1) cc · 20 μm/m² · day · atm
*3) decomposed at a temperature over 250° C.

The invention claimed is:

1. A co-injection-molded multilayer structure, comprising:
a barrier layer and
outer layers laminated on both sides of the barrier layer, wherein
the barrier layer consists essentially of an ethylene-vinyl alcohol copolymer and an alkali metal salt of a higher fatty acid having a melting point of 250° C. or lower;
the ethylene-vinyl alcohol copolymer has an ethylene content of 20 to 60 mol %, a saponification degree of 90% or more, and a melt flow rate (MFR) of 3 to 20 g/10 min at 190° C. and 2160 g;
a content of the alkali metal salt in the barrier layer is 50 to 1500 ppm in terms of metal atoms; and
the outer layers are made of a resin composition comprising an unmodified polypropylene and a maleic anhydride-modified polypropylene having a lower melt viscosity than a melt viscosity of the unmodified polypropylene wherein a mass ratio of the maleic anhydride-modified polypropylene to a total of the unmodified polypropylene and the maleic anhydride-modified polypropylene is 0.025 to 0.2.

2. The co-injection-molded multilayer structure of claim 1, wherein the unmodified polypropylene has an MFR of 10 to 150 g/10 min at 230° C. and 2160 g, and
the maleic anhydride-modified polypropylene has an MFR of 150 to 750 g/10 min at 190° C. and 2160 g.

3. The co-injection-molded multilayer structure of claim 1, wherein the alkali metal salt is sodium stearate or potassium stearate.

4. The co-injection-molded multilayer structure of claim 1, wherein an MFR ratio of the unmodified polypropylene to the ethylene-vinyl alcohol copolymer at 230° C./2160 g is 1 to 10.

5. A container made of the co-injection-molded multilayer structure of claim 1.

6. A method for producing the multilayer structure of claim 1, the method comprising:
co-injection molding the ethylene-vinyl alcohol copolymer and the alkali metal salt, and the resin composition comprising the unmodified polypropylene and the maleic anhydride-modified polypropylene.

7. The co-injection-molded multilayer structure of claim 1, wherein the barrier layer consists of the ethylene-vinyl alcohol copolymer and the alkali metal salt.

* * * * *